United States Patent Office 3,092,865
Patented June 11, 1963

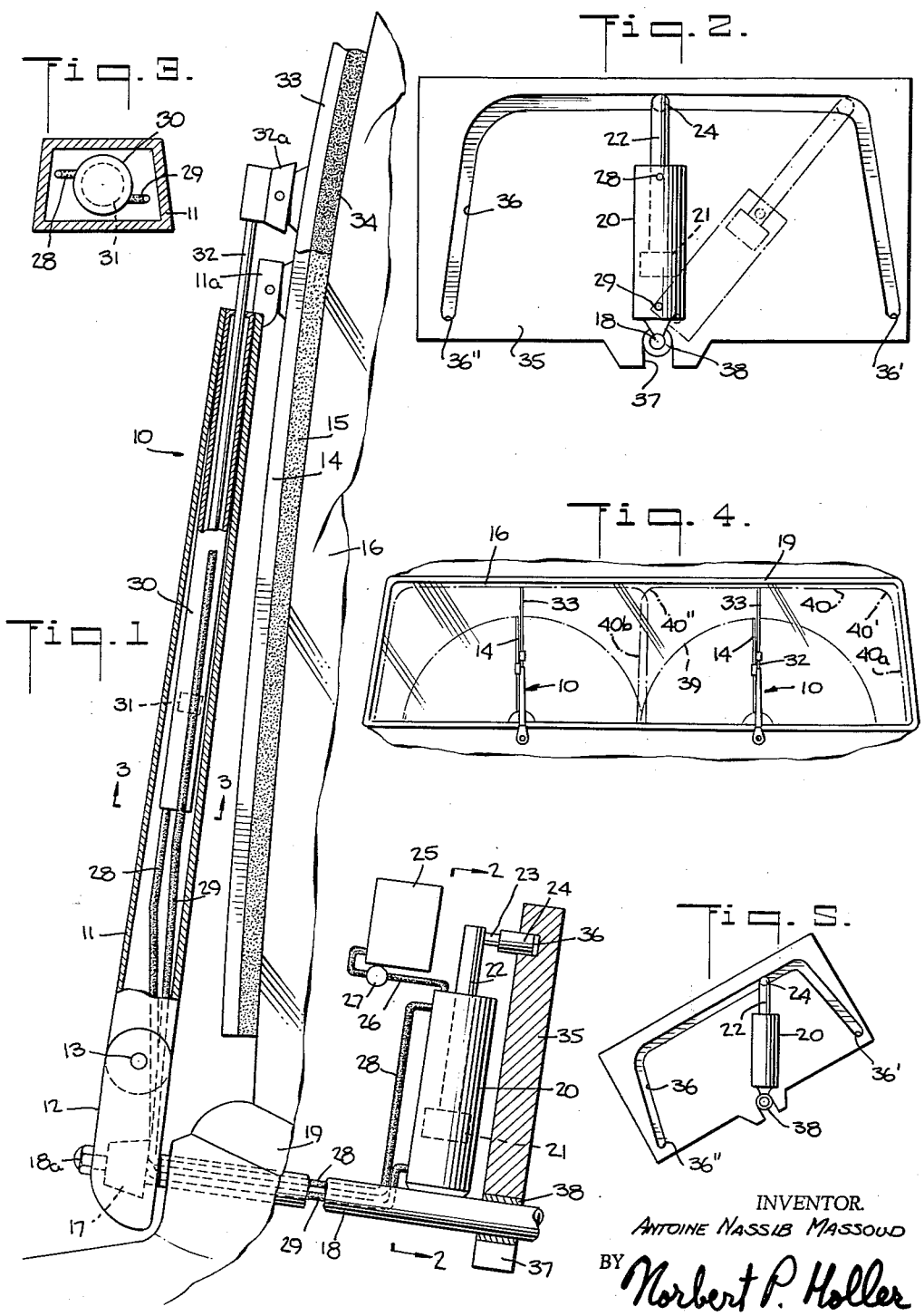

3,092,865
WINDSHIELD WIPERS
Antoine Nassib Massoud, % B. Szempruch,
2236 93rd St., Flushing, N.Y.
Filed Dec. 20, 1962, Ser. No. 246,222
10 Claims. (Cl. 15—250.23)

This invention relates to windshield wipers for automobiles and like vehicles.

In most present-day automobiles and like vehicles, two constant-length windshield wipers oscillating either co-directionally or in opposite senses about respective fixed axes are employed. It is a well known fact that because of geometric limitations it is impossible by the use of such wipers to achieve a clearing of the entire windshield in bad weather. Not only does a central portion of the windshield above the region of confluence of the wiper blade arcs remain uncleared, but so also do both of the opposite side or marginal portions of the windshield adjacent the remote ends of the blade arcs. This is especially noticeable in the case of the oversized "wrap-around" and curved windshields presently the vogue in large cars. Thus, in every such windshield there are three important areas where visibility is substantially impaired.

Attempts have been made to overcome these drawbacks by the provision of a variety of special wiper constructions. Basically the proposed structures entail the provision of dual-blade wipers each having two blades one of which is adapted to be moved linearly in and out parallel to the other during each oscillating stroke of the associated wiper arm. By virtue of the complexity of the proposed structures and the attendant lack of adequate control over the blade movements, none of such attempts has proved fruitful to-date, nor have the suggested constructions found any appreciable acceptance in the trade.

It is an important object of the present invention, therefore, to provide a windshield wiper construction which enables the drawbacks of known devices of this type to be avoided and permits substantially the total area of any type of windshield to be wiped clean during each oscillating stroke of the associated windshield wipers.

A more specific object of the present invention is the provision of a windshield wiper which includes two parallel wiper blades arranged in side by side relationship, with one of such blades being mounted for radial reciprocal movement during each oscillation of the respective wiper arm under the action of a cam-controlled hydraulic pressure.

A further object of the present invention is the provision of means for so controlling the movement of the radially movable wiper blade that any desired type of movement and percentage of windshield surface wiped may be attained.

The foregoing and other objects of the present invention, as well as the structural characteristics of a preferred embodiment thereof and the advantages accruing from its use, will be more fully understood from the following detailed description when read in conjunction with the accompanying drawing in which:

FIG. 1 is a fragmentary and partly sectional side elevational view of an automobile windshield having associated therewith a windshield wiper and actuating means therefor constructed in accordance with the present invention;

FIG. 2 is a sectional view taken along the line 2—2 in FIG. 1;

FIG. 3 is a sectional view taken along the line 3—3 in FIG. 1;

FIG. 4 is a front elevational view of a windshield equipped with a pair of wipers constructed in accordance with the present invention; and FIG. 5 is a view similar to FIG. 2 and illustrates a possible operational modification of the present invention.

The basic windshield wiper construction of the present invention will hereinafter be described as applied to a conventional flat or slightly curved automobile windshield of the type generally found in U.S. and foreign compact or small-size cars, but it is to be understood that the same principles apply to the greatly curved and "wrap-around" windshields of the type characteristic of larger U.S. cars. It will further be appreciated that the two windshield wipers, designated 10 in FIG. 4, on any car are identical in construction and operation, and thus a description of the structural details of one such wiper will suffice.

Referring now more particularly to FIG. 1, the illustrated wiper 10 comprises a dual-section, hollow or tubular wiper arm 11—12, the sections being hinged to each other at 13. The arm section 11 is provided at its outermost end with an extension or socket member 11a which pivotally supports the holder 14 of a wiper blade 15 adapted to be swept in a circular arc across the surface of the windshield 16. The arm section 12 is seated on a knurled head 17 of a hollow axle 18 and thus cannot rotate relative to the axle. The arm section 12 is preferably also secured to the axle by means of a bolt or screw 18a. The axle 18 is rotatably journaled in the body of the automobile beneath the windshield 16, for example in the lower part of the frame 19 of the windshield. The axle 18 is connected, in a manner not shown, to any suitable driving mechanism capable of rotating the axle back and forth through a predetermined angle about its own axis.

Within the confines of the automobile, the axle 18 is rigidly connected with a double-acting hydraulic cylinder 20 in which a piston 21 is arranged for axial reciprocal movement. The piston is connected with a piston rod 22 that extends out of the free end of the cylinder and is provided with a radially projecting pin 23 on which is rotatably mounted a roller 24. The function of this roller will be more fully explained presently. A constant supply of pressure fluid in the cylinder 20 is ensured by the provision of a reservoir 25 which communicates with the cylinder via a conduit 26 in which is incorporated an orifice check valve 27. This valve, the construction of which is well known and thus is not explicitly illustrated in the drawing, is of a type commercially available and permits a relatively larger flow of fluid from the reservoir into the cylinder than from the cylinder into the reservoir.

The opposite end regions of the cylinder 20 communicate with two ducts 28 and 29 which may, for example, be flexible tubes made of a highly temperature-resistant material such as neoprene or other synthetic plastics. The tubes 28 and 29 extend through the hollow axle 18 and into the wiper arm. Arranged in the wiper arm section 11 and suitably affixed thereto is a double-acting hydraulic cylinder 30 in which a piston 31 is arranged for sliding reciprocal movement. The duct or tube 28 communicates with the cylinder 30 adjacent the innermost end thereof, while the duct or tube 29 communicates with the cylinder 30 adjacent the outermost end thereof. The piston 31 is connected with a piston rod 32 that extends out of the cylinder 30 and through the open outer end of the wiper arm section 11 and is provided with an extension or socket member 32a which pivotally supports the holder 33 of a second wiper blade 34. The wiper blade 34 is closely juxtaposed to the wiper blade 15 and in substantially parallel relation thereto.

As clearly shown in FIG. 1, the piston 21 is larger in diameter and cross-sectional area than the piston 31. The precise ratio between the areal and dimensional characteristics of the pistons will be determined by the size and shape of the windshield and by the percentage of the windshield surface to be swept. Merely by way of example, a diametral ratio of 4:1 between the pistons 21 and 31 has been found adequate for windshields of many standard size U.S. cars, but as will be clearly understood, smaller or larger windshields will require correspondingly different ratios.

From the foregoing it is apparent that when the piston 21 in the cylinder 20 moves toward the lower end of the latter as seen in FIG. 1, hydraulic pressure is transmitted through the duct 29 into the outermost end of the cylinder 30 so as to cause the piston 31 therein to move toward its innermost terminal position and thus to retract the piston rod 32. This effects a linear displacement of the wiper blade 34 alongside the wiper blade 15 radially of and toward the axle 18. On the other hand, when the piston 21 in the cylinder 20 is moved toward the free end of the latter, i.e. toward the upper end of the cylinder as seen in FIG. 1, hydraulic pressure is transmitted through the duct 28 into the innermost end of the cylinder 30 so as to cause the piston 31 to advance therethrough in an outward direction. This protracts the piston rod 32 and causes a linear displacement of the wiper blade 34 radially of and away from the axle 18. The reciprocal linear displacement of the radially movable blade 34 relative to the radially stationary blade 15 thus either increases or reduces the overall working length of the wiper.

The reciprocal movements of the piston 21 which result in the radial reciprocation of the movable wiper blade 34 are effected, in accordance with the principles of the present invention, with the aid of an interchangeable and replaceable control cam plate 35. The plate 35 is provided in one face with a cam groove or track 36 the width of which is just slightly greater than the diameter of the roller 24 mounted on the projection 23 of the piston rod 22. In use, the cam plate 34 is fixedly mounted, in a manner not shown in the drawing, in the automobile with the groove 36 facing toward and slidably receiving the roller 24. Merely by way of example, the plate 34 may be provided in one edge with a notch or recess 37 dimensioned to accommodate the axle 18, preferably with the aid of a suitable bearing 38.

The manner of operation of the windshield wiper 10 will now be described first only with reference to the right-hand wiper of FIG. 4. It is to be noted that in the illustrated embodiment of the invention, for reasons which will become clear as the description proceeds, the cam track 36 is slightly asymmetrical relative to the location of the axis of rotation, the end 36' of the track being at a greater distance from the said axis than the end 36'' of the track. As a starting point, it is assumed that the axle 18 has been rotated so as to dispose the cylinder 20 relative to the cam plate 34 in the position indicated in solid lines in FIG. 2. The roller 24 acting as a cam follower is thus disposed at an intermediate point of the horizontal linear stretch of the cam track 36. Correspondingly, the wiper arm section 12 of the right-hand wiper shown in FIG. 4 has been fitted onto the associated axle 18 so as to ensure that the said right-hand wiper will be erect and essentially at the center of the arc of movement 39 of the radially fixed blade 15. From FIG. 2 it can be seen that the point of the cam track 36 at which the follower roller 24 is located is not as close to the axis of rotation of the axle 18 as the end 36'' of the cam track. The piston 21 is, therefore, in a position intermediate its terminal positions within the cylinder 20, and correspondingly the piston 31 is in an intermediate position within the cylinder 30. The piston rod 32 and the movable wiper blade 34 are, consequently, somewhat protracted and the overall working length of the composite wiper blade 14—34 is at an intermediate value, somewhat less than the top to bottom dimension of the windshield 16 by virtue of the fact that the outermost tip of the blade 34 is disposed a short distance below the top part of the windshield frame 19 while the innermost tip of the blade 14 is disposed a short distance above the bottom part of the windshield frame.

As the axle 18 is now rotated in such a direction as to displace the right-hand wiper in FIG. 4 to the right of the center position, the cylinder 20 moves angularly with the axle to the right across the plate 35 in FIG. 2 and causes the roller 24 to ride in the same direction along the groove or track 36. As a result the piston rod 22 is drawn out of the cylinder 20 and progressively advances the piston 21 toward the outer end of the said cylinder. This applies a positive hydraulic pressure to the inner face of the piston 31 in the cylinder 30 and causes the piston to be advanced outwardly through the cylinder 30 so as to protract the piston rod 32 and move the blade 34 linearly along the blade 14 and radially away from the axle 18. As previously explained, the ratio of the diameter of the piston 21 to the diameter of the piston 31 is so chosen that despite the small size of the cam plate 35 and the limited extent of the movement of the piston rod 22, the linear movement of the blade 34 is considerably greater. The shape of the cam track or groove 36 is such that the outermost tip of the blade 34 moves along a line 40 which parallels the top part of the windshield frame 19 substantially immediately below the same.

When the axle has been rotated sufficiently to dispose the cam follower 24 at the right-hand end of the horizontal stretch of the track 36, as shown in phantom outline in FIG. 2, the movable wiper blade is protracted to its maximum extent and its outermost tip is located at the bend 40' of the line 40 in the upper right-hand corner of the windshield. Thereafter, upon further rotation of the axle 18, the roller 24 rides along the inclined right-hand stretch of the track 36 toward the end 36' of the latter. As a result, the piston 21 is progressively forced into the cylinder 20, whereby a positive hydraulic pressure transmitted through the duct 29 is applied to the outer face of the piston 31 and causes the same to be moved inwardly through the cylinder 30 so as to displace the movable blade 34 progressively along the fixed blade 14 and radially toward the axle 18. When the roller reaches the track end 36', the piston 21 is again at an intermediate position in the cylinder 20, and correspondingly the overall working length of the composite blade 14—34 is at an intermediate value.

The part 40a of the line 40 along which the outermost tip of the radially movable blade 34 travels during this last-described interval accordingly parallels the right-hand side member of the windshield frame 19. Thus, the entire right-hand section of the windshield is wiped clean, including not only the area within the confines of the line 39 but also the area between the lines 39 and 40—40a.

The axle 18 now begins to rotate in the opposite direction and swings the cylinder 20 to the left over the cam plate 35. During the first half of this reverse movement, i.e. until the cylinder reaches the solid-line position illustrated in FIG. 2, the actuation of the movable wiper blade 34 by the piston 31 under the hydraulic pressure of the fluid displaced by the piston 21 is precisely the reverse of that during the initial right-hand movement, until the right-hand wiper reaches the position of FIG. 4. Upon further rotation of the axle past this stage, the outermost tip of the blade 34 moves along the left-hand half of the line 40 shown in FIG. 4, due to the protraction of the blade by the outward movement of the piston 31 under the action of the piston 21, until the blade tip reaches the bend 40'' in the line 40, corresponding to the arrival of the cam follower 24 at the left-hand end of the horizontal stretch of the track 36. Thereafter, as the cam follower rides along the inclined left-hand stretch of the track 36, the blade is again progressively retracted, its outermost tip moving along the part 40b of the line 40, until the follower reaches the end 36'' of the track 36. In the illustrated embodiment of the invention, this point is radially closest to the axle 18 and corresponds to the smallest overall length of the composite wiper blade 14—34.

As the right-hand wiper 10 is thus continuously oscillated back and forth, the aforesaid operational cycle is repeated again and again. Concurrently, of course, the left-hand wiper 10 is actuated in the same manner. In the illustration of FIG. 4, the left-hand wiper is associated with a cam plate the cam track of which is a mirror image of the track 36. However, the left-hand wiper could be associated with a cam plate having a track identical with the track 36 or, if a difference in the sweeps were desired, with a cam plate having a track of completely different control configuration. In the arrangement of FIG. 4, the areas swept by the two wipers overlap somewhat in the central region of the windshield, which would also be the case for any cam plate arrangement, so that the entire windshield is cleaned during each oscillating stroke of the two wipers, leaving no region of impaired visibility.

It is to be noted that although the operation of the wipers 10 has been described for the case in which they both move across a sufficiently large windshield through an arc of essentially 180° at each stroke, the principles of the present invention are equally applicable to systems in which the blades are oscillated through lesser and/or unequal angles. As has already been mentioned, the two cam means need not be identical, so that the areas swept by the respective wipers are not identical, but is is apparent that this result would also be obtianed if two identical cams were to be used with wipers oscillated through unequal angles. In order to permit any desired variation of these factors in any given system, therefore, it is preferred that the length of the cam track in each cam plate be made at least sufficiently long to accommodate the maximum possible wiper sweep, and preferably the track should even be longer than that.

It is also possible to vary the wiper sweep in other ways. Thus, the wiper arm section 12 for any wiper may be fitted onto the associated axle head 17 for a different starting position than that shown in FIG. 4; for example, with the cylinder 20 centered over the cam plate 35, the wiper 10 could be angled toward either side or toward either upper corner of the windshield. Alternatively, the cam plate 35 may be secured in different angular relationship to the starting wiper position. This possible modification of the invention is illustrated schematically in FIG. 5. Still further, the wiper sweep may be varied by substituting different cam plates in which the track is either closer to or farther away from the axle or in which different cam track shapes and configurations are provided. The choice of any of the foregoing arrangements will in the final analysis depend on the type and dimensions of the windshield to be swept and the visibility requirements which must be met, assuming, of course, that the wiper blades and holders are constructed to conform to the curvature of the associated windshield at all angular orientations of the wipers.

As will be appreciated from the preceding description, the present invention is characterized by the highly advantageous factor that the relationship between the magnitude of the angular sweep of the wiper 10 on the one hand and the magnitude of the radial displacement of, or area swept by, the radially movable wiper blade 34 on the other hand is not required to be a constant function. As a result, the wiper construction according to this invention is of almost unlimited universality and versatility, being adaptable to substantially all makes of cars and like vehicles and to all types of windshields. To this end, however, it is deemed advisable to employ a radially fixed wiper blade which is somewhat shorter than those presently employed in all non-elongatable wipers.

Still another great advantage of the construction according to the present invention derives from the use of the closed hydraulic pressure system 20—28—29—30 for the actuation of the movable wiper blade. This system ensures that every displacement of the said blade, however slight and in either direction, is brought about by a positively applied force which never varies, since not only is the quantity of the pressure fluid in the system essentially constant, but the piston diameter ratio is a constant in each given system. Moreover, the hydraulic pressure fluid never weakens, whereas in some of the known extensible wiper constructions the springs and cables there employed do have fatigue limits and tend to deteriorate rather rapidly over even relatively short periods of use. In connection with this point it is noted that the relative incompressibility of the hydraulic fluid ensures that even if the movable blade and its piston rod should happen to become immobilized, e.g. upon the vehicle being left on the street in extremely cold and sleety weather, the movement of the piston 21 will generate sufficient force to free these elements and enable them to perform their intended functions. Also, the operability of the system according to the present invention, both in the coldest and the hottest climates in which it may be used, is never impaired, since the hydraulic fluid employed is highly resistant to low as well as high temperatures and since the main supply of the fluid is enclosed in the body of the vehicle where it is not subjected to extremes in ambient atmospheric conditions.

Although the hydraulic system has been described as preferably employing flexible tubes or hoses for conducting the fluid between the cylinders 20 and 30, it will be appreciated that other types of duct arrangements may be provided which are basically rigid, e.g. pipes or bored blocks, etc., except at those locations where they may be subjected to flexure and where mobility is essential, such as at the junction between the axle and the wiper arm section 12.

It is to be understood that the disclosure herein of preferred wiper arrangments according to the present invention is for purposes of illustration only, and that the specific structural features and relationships shown are essentially diagrammatic and susceptible of modification without departure from the spirit and scope of the present invention as defined by the hereto appended claims.

Having thus described my invention, what I claim and desire to secure by Letters Patent is:

1. A windshield wiper, comprising a rotatably oscillatable axle, a wiper arm secured to said axle and extending essentially radially therefrom, a first wiper blade pivotally supported by said arm at a fixed radial distance from said axle, a second wiper blade disposed adjacent said first wiper blade, a member carried by said arm for linear displacement therealong radially of said axle and pivotally supporting said second wiper blade, a hydraulic pressure system operatively connected with said member for applying positive forces thereto to effect the corresponding linear displacements thereof in opposite directions, and cam means having a predetermined working contour operatively connected with said hydraulic system for actuating the same so as to effect the required displacements of said member and said second wiper blade during each oscillating stroke of said axle.

2. A windshield wiper according to claim 1, said hydraulic pressure system comprising a cylinder supported by said axle for movement therewith and having a piston adapted upon reciprocation in said cylinder to apply corresponding pressures to an adjunct of said member, and said cam means comprising a plate adjustably fixed in position relative to said axle and defining a contoured cam track, and a cam follower carried by an adjunct of said piston and engaging said cam track so as to ride therealong during the movement of said cylinder with said axle.

3. A windshield wiper according to claim 1, said hydraulic pressure system comprising a first cylinder carried by said arm and having a piston connected to said member, a second cylinder supported by said axle for movement therewith and having a piston displaceable by said cam means, and duct means establishing communication between each end of said first cylinder and a respective end of said second cylinder.

4. A windshield wiper according to claim 3, said cam means comprising a plate adjustably fixed in position relative to said axle and defining a contoured cam track, and a cam follower carried by an adjunct of said piston in said second cylinder and engaging said cam track so as to ride therealong during the movement of said second cylinder with said axle.

5. A windshield wiper according to claim 4, said second cylinder and its associated piston being larger in diameter than said first cylinder and its associated piston, whereby the displacements of the latter and said second wiper blade are multiples of the displacements of said piston in said second cylinder.

6. A windshield wiper according to claim 5, the contours of said cam track being so chosen that the path of movement of the outermost tip of said second wiper blade in the middle region of a given windshield intersects the path of movement at the same region of the outermost tip of the second wiper blade of another windshield wiper associated with the same windshield.

7. A windshield wiper, comprising a rotatably oscillatable axle, a wiper arm secured to said axle and extending essentially radially therefrom, a first wiper blade pivotally supported by said arm at a fixed radial distance from said axle, a first hydraulic cylinder carried by said arm, a first piston reciprocally slidable in said first cylinder, a second wiper blade pivotally supported by an adjunct of said first piston adjacent said first wiper blade, a second hydraulic cylinder rigidly supported by said axle for movement therewith, a second piston repicrocally slidable in said second cylinder, cam means defining a cam track of predetermined configuration mounted adjacent said axle, a cam follower carried by an adjunct of said second piston and engaging said cam track, and a pair of ducts connecting the opposite ends of said first cylinder with the respective opposite ends of said second cylinder.

8. A windshield wiper, comprising a hollow, rotatably oscillatable axle, a hollow wiper arm secured to said axle and extending essentially radially therefrom, a first wiper blade pivotally supported by said arm at a fixed radial distance from said axle, a first hydraulic cylinder mounted within said arm, a first piston reciprocally slidable in said first cylinder, a second wiper blade pivotally supported by an adjunct of said first piston adjacent said first wiper blade, a second hydraulic cylinder rigidly supported by said axle for movement therewith, a second piston reciprocally slidable in said second cylinder, cam means defining a cam track of predetermined configuration mounted adjacent said axle and the plane of angular movement of said second cylinder, a cam follower carried by an adjunct of said second piston and engaging said cam track, and a pair of ducts extending through said arm and said axle and connecting the opposite ends of said first cylinder with the respective opposite ends of said second cylinder.

9. A windshield wiper according to claim 8, said first cylinder and piston being smaller in diameter than said second cylinder and piston.

10. A windshield wiper, comprising a hollow, rotatably oscillatable axle, a hollow wiper arm secured to said axle and extending essentially radially therefrom, a first wiper blade pivotally supported by said arm at a fixed radial distance from said axle, a first hydraulic cylinder mounted within said arm, a first piston reciprocally slidable in said first cylinder, a first piston rod connected with said piston and extending therefrom out of said first cylinder and said arm radially away from said axle, a second wiper blade pivotally supported by said piston rod adjacent the outermost end thereof alongside said first wiper blade, a second hydraulic cylinder rigidly supported by said axle for movement therewith, a second piston reciprocally slidable in said second cylinder, a second piston rod connected to said second piston and extending from said second cylinder, said second piston and cylinder being larger in diameter than said first piston and cylinder, cam means mounted adjacent said axle and the plane of angular movement of said second cylinder and defining a cam track of predetermined contours, a cam follower carried by said second piston rod and engaging said cam track, and a pair of ducts extending through said arm and said axle and connecting the opposite ends of said first cylinder with the respective opposite ends of said second cylinder.

References Cited in the file of this patent

UNITED STATES PATENTS

| | | |
|---|---|---|
| 2,629,891 | Greene | Mar. 3, 1953 |
| 3,077,628 | Lystad | Feb. 19, 1963 |